United States Patent
Alexa

[19]

[11] Patent Number: 6,000,745
[45] Date of Patent: Dec. 14, 1999

[54] PICKUP TRUCK BED COVER

[76] Inventor: Teodor Alexa, 505 Emerald Lake Path, Sugar Hill, Ga. 30518

[21] Appl. No.: 08/960,608

[22] Filed: Oct. 29, 1997

[51] Int. Cl.[6] ..................................................... B60P 7/02
[52] U.S. Cl. .............................. 296/100.12; 296/100.11; 296/100.16; 296/105
[58] Field of Search ........................ 296/100.01, 100.02, 296/100.03, 100.11, 100.12, 100.16, 100.17, 100.18, 104, 105, 65.13, 65.14, 26.08, 26.09; 16/88, 96 R, 106

[56] References Cited

U.S. PATENT DOCUMENTS

| 3,093,424 | 6/1963 | Pernetta | 16/88 X |
|---|---|---|---|
| 3,606,448 | 9/1971 | Walker | 296/105 |
| 4,252,363 | 2/1981 | Rodrigue | 296/100.12 |
| 4,289,346 | 9/1981 | Bourgeois | 296/105 |
| 4,310,194 | 1/1982 | Biller . | |
| 4,332,265 | 6/1982 | Baker . | |
| 4,639,034 | 1/1987 | Amos | 296/105 X |
| 4,709,956 | 12/1987 | Bowman | 296/100.18 |
| 4,789,196 | 12/1988 | Fields | 296/100.18 |
| 4,936,724 | 6/1990 | Dutton | 296/100.18 X |
| 4,938,523 | 7/1990 | Camp . | |
| 5,054,841 | 10/1991 | Zalman | 296/100.18 X |
| 5,338,084 | 8/1994 | Wardell | 296/100.12 X |
| 5,353,826 | 10/1994 | Davis, Sr. | 296/100.18 X |
| 5,531,497 | 7/1996 | Cheng | 296/100.11 X |
| 5,556,156 | 9/1996 | Kirk . | |
| 5,845,957 | 12/1998 | Hurst | 296/100.12 |

Primary Examiner—D. Glenn Dayoan
Assistant Examiner—Chad D Wells
Attorney, Agent, or Firm—Kenneth L Tolar

[57] ABSTRACT

A new and improved pickup truck bed cover includes a plurality of substantially U-shaped frame members integrally supporting a cover member. The frame members each have first and second terminal ends with a roller and spring loaded lock mechanism at each terminal end. The rollers rollably engage a pair of channels each attached to a side wall of a pickup truck allowing the device to be collapsed towards the truck passenger cab or extended therefrom. The spring loaded lock mechanism allows the rollers to be selectively anchored within the channels preventing the frame members from rolling when the cover is in a fully extended position. The cover member has a rear panel with a window, a brake light, and an access zipper thereon. The cover member may then be stored within a sleeve and flap combination attached to the pickup truck passenger cab.

14 Claims, 3 Drawing Sheets

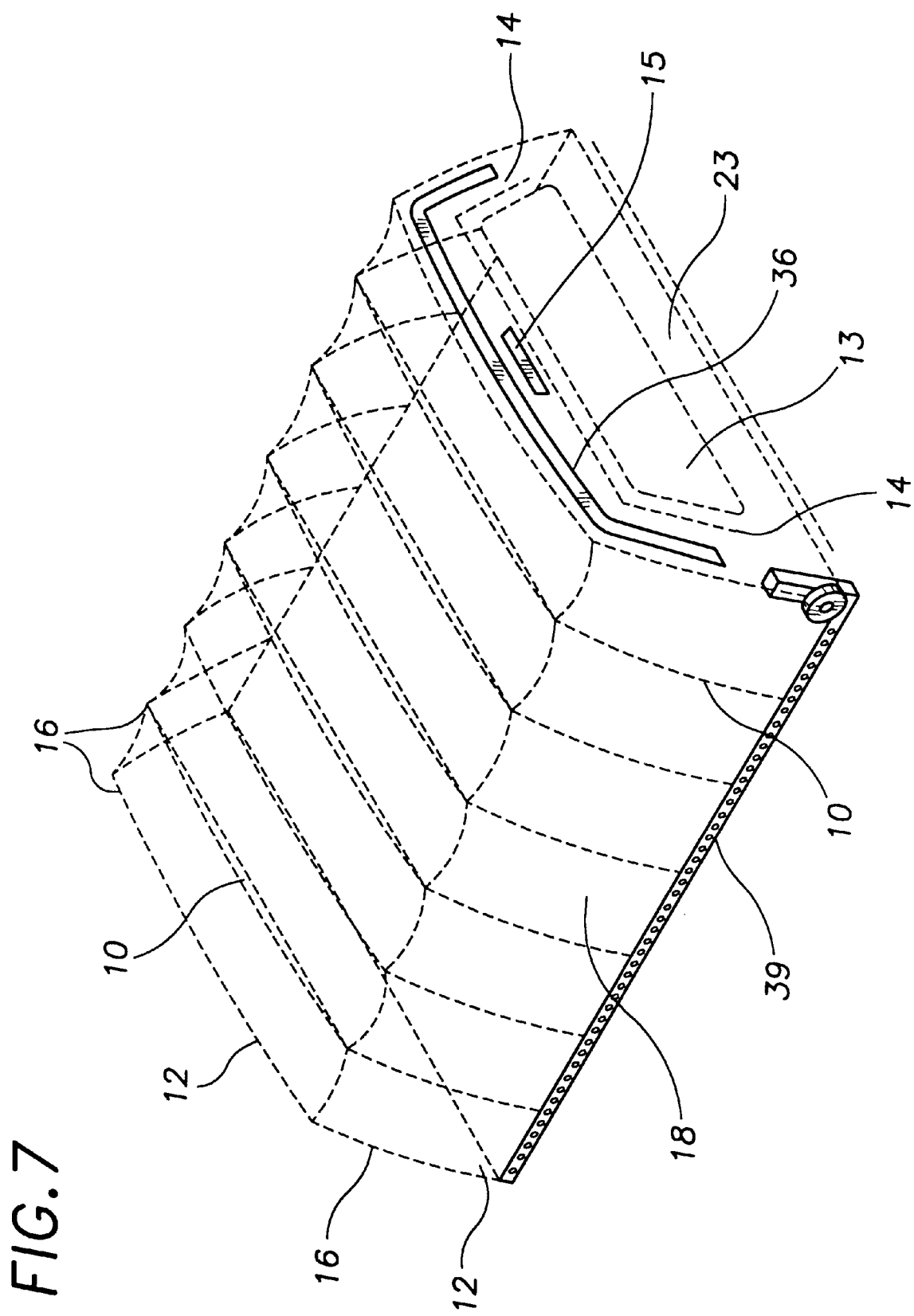

PICKUP TRUCK BED COVER

BACKGROUND OF THE INVENTION

Removably attached pickup truck bed covers have existed for years to selectively enclose the bed area of a pickup truck. Such devices sometimes consist of a tent like structure allowing the trunk bed to be used as temporary sleeping quarters, or a canopy type protective cover for enclosing and protecting cargo stored and transported therein. The present invention relates to a pickup truck bed cover which may be easily mounted to the bed sidewalls and which may be collapsed and stored against the truck passenger cab as desired. Specifically, the device is supported by frames each having opposed locking rollers engaging a channel mounted to the bed side walls allowing the device to be collapsed or the rollers to be selectively locked into place. The channels are configured such that the supporting frames, their attached rollers and accompanying cover may be easily removed from the truck bed side walls.

DESCRIPTION OF THE PRIOR ART

Various tents and covers for enclosing a pickup truck bed currently exist in the prior art. Heretofore, the prior art devices have failed to provide the advantages of the present invention. Specifically, these devices usually comprise a tarpaulin cover which is placed over a plurality of support frames. The tarpaulin cover is typically secured to the frames using hooks, straps or similar attachment means. These designs are inadequate because the cover may flap or be easily blown off the support frames when the wind is blowing or the vehicle is moving. Also, when removing the device, a user must first detach the cover and then remove the frame members from the bed side walls in a two step process. Many of the prior art frame members are permanently affixed to the pickup truck sidewalls requiring extensive labor to remove the device if the user so desires. In addition, the prior art devices which may be rollably collapsed and stored against the truck passenger cab do not have adequate means for selectively locking or anchoring the wheels to prevent the frame members from shifting. For example, U.S. Pat. No. 5,556,156 issued to Kirk discloses a utility truck bed cover comprising a plurality of U-shaped frame members which are secured to the truck bed walls using a clamping arrangement. Alternatively, each terminal end of the frame members are attached to a transverse axle extending outwardly from a cylindrical, enclosed longitudinal track attached to the truck sidewalls. A distal end of each transverse axle is attached to a wheel permanently mounted within the longitudinal channel so that the cover may be collapsed or extended. A tarpaulin cover is placed over the U-shaped frame members. A second set of U-shaped frame members are mounted to the truck bed side walls adjacent the cab which supports a small cover for storing and receiving the device when in a collapsed position. The first set of U-shaped frame members are pivotally attached to the side walls to allow the tarpaulin cover to be stretched therearound. Additionally, the frame members are segmented to allow detachment for storage and shipment. However, because the longitudinal track mechanism completely encloses the wheels, the rolling frames may only be removed by disassembling the frame members or the track mechanism. Furthermore, means for selectively immobilizing the wheels is not disclosed so that the wheels may freely roll within the track mechanism at all times. Accordingly, when the cover is extended, the frame member may easily shift resulting in distortion or even collapse of the enclosure.

U.S. Pat. No. 4,938,523 issued to Camp relates to a combination contractible tent/truck cover. An elongated rail is attached to each side wall of a truck bed. A plurality of substantially U-shaped frame members that support a cover panel slidably engage the rails allowing the structure to slide backwards to a collapsed position or forwards to an extended position. The rear portion of the cover panel contains a peripheral zipper including an insert portion which can be removed and replaced with two different zippered door panels. The cover may also contain windows on either side. When not in use, the cover is maintained in a collapsed position by use of two straps fastened to and surrounding the collapsed cover. Furthermore, the apparatus may be removed from the truck bed and used as a tent.

U.S. Pat. No. 4,310,194 issued to Biller discloses a tent camper for a pickup truck generally comprising a cloth cover surrounding a collapsible frame. The frame consists of a pair of substantially U-shaped frame supports, one of which is mounted toward the tailgate and the other toward the front of the cargo area. The cloth cover is attached to the frame with straps and covers the floor of the cargo compartment as well as the tailgate.

U.S. Pat. No. 4,332,265 issued to Baker discloses a collapsible tent attachable to a truck bed. The tent fits over a frame which comprises a plurality of connected pieces of PVC piping or similar material which are then attached to the truck bed. The enclosure may be dismantled as desired. As indicated above, none of the prior art truck bed covers have supporting frames rollably engaging the truck sidewalls in which the wheels may be selectively immobilized. Furthermore, none of the prior art devices have frame members integrated within the cover panel. Finally, the above described collapsible devices are stored within a separate, frame supported canopy which is bulky and time consuming to erect or disassemble. Alternatively, the above described collapsible devices are secured to the rear of the cab using a pair of straps which are tenuous and unreliable.

SUMMARY OF THE INVENTION

The present invention relates to a new and improved collapsible pickup truck bed cover which overcomes the above mentioned disadvantages of the prior art. The device comprises a plurality of inverted U-shaped frame members each having first and second terminal ends. Attached to each first and second terminal end of the U-shaped frame members is a roller and associated spring loaded lock mechanism. A cover member made from canvas or a similar durable material is supported by the U-shaped frame members opposing edges of which are attached to a pickup truck bed sidewalls using a plurality of snap style closures. Preferably, the cover member has a plurality of integral, substantially parallel longitudinal sleeves having open first and second ends each of which receives a U-shaped frame member. Integrating the frame members with the cover member in this manner tightly secures the cover member to the frame members preventing it from flapping or blowing off as the vehicle is moving. A pair of longitudinal open channels are mounted to opposing side walls of the pickup truck bed using screws or other similar attachment means. Each roller on the first and second terminal ends of the frame members rollably engage the channels allowing the frame members to roll backwards and forwards along the pickup truck bed side walls. The open channels allow the frame members and cover member to be easily and simultaneously removed therefrom without disassembling either the channels or the frame members. The spring loaded lock mechanism allows the rollers to be selectively immobilized thereby anchoring the frame members to a desired location within the open channels. The rear of the cover member has a brake light electrically connected to the vehicle's brake switch circuitry to supplement the vehicle's standard brake lights. The device may be easily collapsed and secured within a sleeve and flap mounted to the truck cab. It is therefore an object of the present invention to provide a pickup truck bed cover which may be easily folded and stored against the truck cab.

It is yet another object of the present invention to provide a pickup truck bed cover which has integral frame members preventing the cover member from being displaced therefrom.

It is yet another object of the present invention to provide a pickup truck bed cover having a brake light thereon.

It is yet another object of the present invention to provide a pickup truck bed cover which may be easily rolled backwards and forwards.

It is yet another object of the present invention to provide a pickup truck bed cover rollably engaging channels attached to the pickup truck side walls which may be selectively anchored to a desired location.

It is yet another object of the present invention to provide a pickup truck bed cover which may be collapsed and secured within a storage sleeve. Other objects, features and advantages of the present invention will become readily apparent to those skilled in the art from the following detailed description of the preferred embodiment when considered with the attached drawings and the appended claims.

BRIEF DESCRIPTION OF THE DRAWINGS

FIG. 7 is a rear view of the cover depicting the rear window component, the auxiliary brake light and zippered access port.

DESCRIPTION OF THE PREFERRED EMBODIMENT

Figure 2:
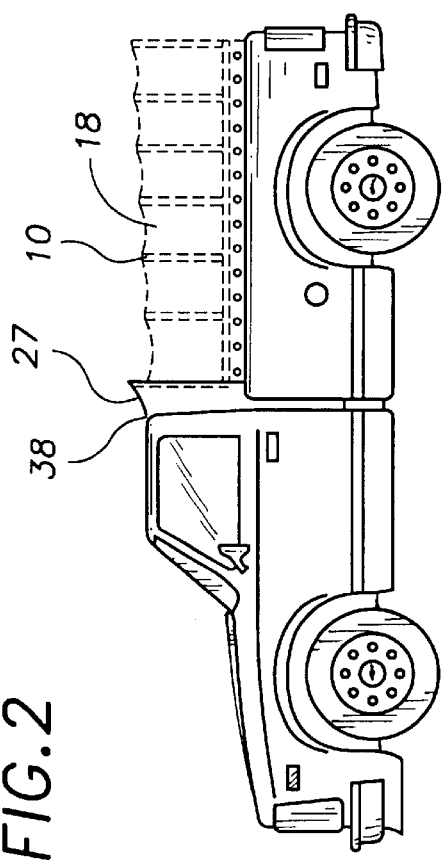
FIG. 2 is a side view of the inventive device.
Figure 3:
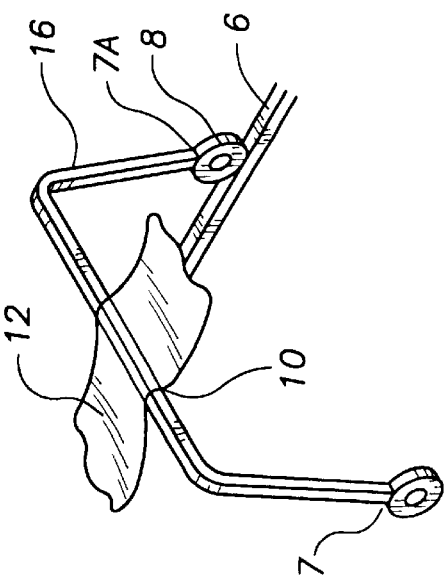
FIG. 3 is a detailed view of the roller and channel mechanism.
Figure 1:
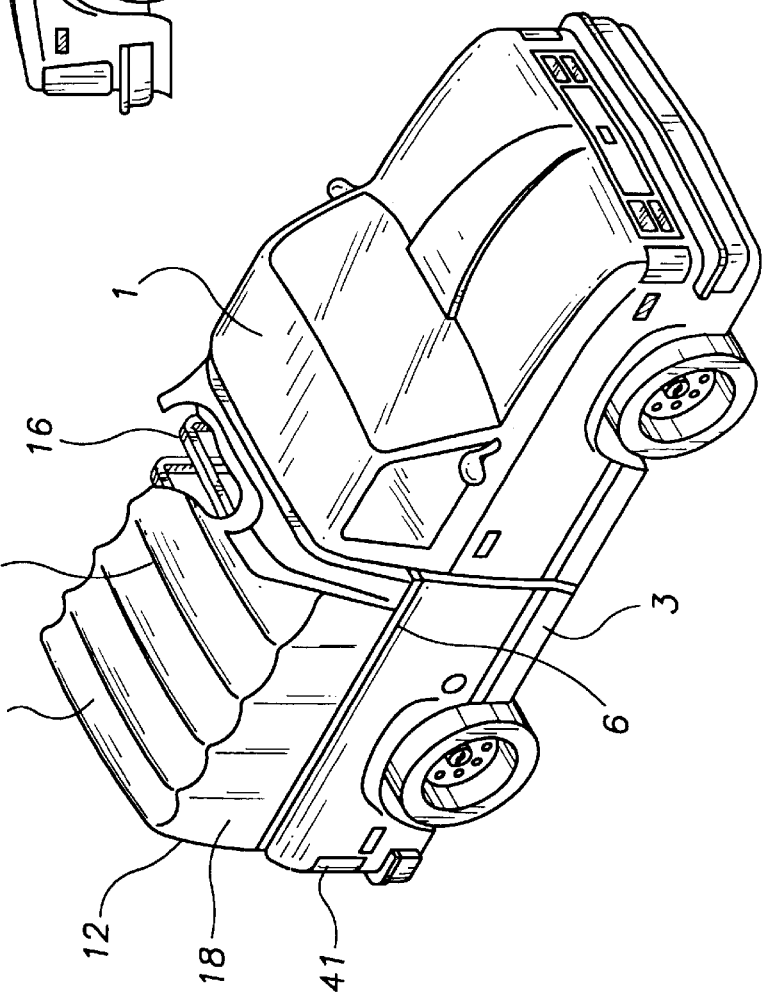
FIG. 1 is a perspective view of the inventive device in combination with a pickup truck.

Referring now to FIGS. 1 through 7, the pickup truck bed cover of the present invention is used in conjunction with a standard pickup truck shown generally at numeral 1 for protecting cargo therein from weather and other external elements. The pickup truck usually has an open bed 2 having upwardly projecting parallel sidewalls 3, a rear wall 4 which usually has a tailgate 25 and an upwardly projecting front wall 5. Each side wall 3 has a substantially planar upper surface 26. Immediately adjacent the front wall 5 and in substantially the same vertical plane is the rear wall of a passenger cab 38.

An elongated channel 6 having a pair of substantially arcuate upwardly depending sidewalls and an open top is attached to the upper surface 26 of each of the opposing sidewalls 3 of the pickup truck bed. The channels 6 are attached to the sidewalls using stainless steel screws, bolts or other similar attachment means. Preferably, a strip of single sided adhesive weather stripping 31 is placed on the upper surface 26 of each side wall 3 and below each channel to prevent rain and moisture from leaking into the truck bed area. The weather stripping 31 is made from foam rubber, rubber or a semi flexible material which can provide a moisture tight seal between the channel 6 and side wall 3.

The present invention also comprises a plurality of inverted substantially U-shaped frame members 16 each having first 7 and second terminal ends 7A. Attached to each first and second end is a roller 8 and associated spring loaded lock mechanism 9. Each of the rollers 8 at the first terminal ends are received within and rollably engage a channel 6 while the rollers 8 at the second terminal ends are received within and rollably engage the opposing channel 6. The spring loaded lock mechanism 9 is of the type generally known in the prior art such as those found on wheel mounted utility carts, laundry carts, airline beverage carts, etc. The lock mechanism 9 is received within each frame member 16 proximal its first and second ends.

A latch means 100 protrudes outwardly from each frame member proximal each terminal end and is in communication with the internally disposed spring loaded lock mechanism 9. Displacing a latch 100 in a vertical direction causes the locking mechanism 9 to immobilize its associated roller 8 while displacing the latch 100 in an opposite vertical direction releases the locking mechanism 9 so that the roller 8 may freely rotate within a channel 6.

The device also comprises a cover member 12 preferably made with canvas or a similar durable weather resistant material. The cover member 12 has a substantially rectangular configuration forming a box type enclosure when placed over the frame members having a pair of side walls 18, which terminate at a pair of parallel, opposing peripheral edges 18A, a top surface 17 and a rear panel 23. Extending from one side wall peripheral edge to the other are a plurality of substantially parallel longitudinal, integral sleeves 10 each having a pair of opposed open ends adjacent with the peripheral edges for receiving a frame member 16. Preferably, the sleeves are sewn into the cover member with the frames therein. The frame receiving sleeves 10 allow the canvas cover 12 to remain securely attached to the frame members 16 while the vehicle is moving or the wind is blowing. Securing the cover member 12 to the frame members 16 in this manner also allows the frames 16 and cover 12 to be removed simultaneously without disassembling the individual components.

The cover member rear panel 23 has a substantially trapezoidal transparent window 13 having four peripheral edges made from a shatter resistant material such as acrylic. Surrounding and substantially parallel to three of the peripheral edges of the window 13 is an access zipper 14 for selectively enclosing the cover and providing an access to the interior thereof.

Immediately above the zipper 14 is an auxiliary brake light component 15. The auxiliary brake light component 15 is electrically connected to the standard brake light switch circuitry of the vehicle providing an additional warning to a trailing vehicle. The brake light 15 is electrically connected to the circuitry using conventional means such as that used in wiring trailer lights. The auxiliary brake light 15 is designed to supplement the two standard brake lights 41 typically found on the truck bed rear wall, each adjacent opposing sides of the tail gate. Therefore, when the vehicle driver depresses the brake pedal, the auxiliary light 15 as well as the standard brake lights 41 will be illuminated. The auxiliary light is similar to the rear window mounted brake lights found on utility vehicles such as Jeep Cherokees, Ford Explorers and Broncos. Some pickup truck models have rear window mounted brake lights which would be obstructed by the pickup truck cover. The brake light 15 on the cover member would then replace the otherwise obstructed brake light on the rear window.

Figure 5:
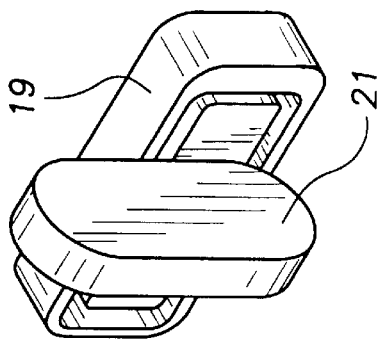
FIG. 5 is a detailed view of a butterfly clip used to attach the peripheral edge of the cover member rear panel to the truck tailgate.

Attached to the upper surface of both the tailgate 4 and truck bed rear wall 25 is a longitudinal elongated bracket 40 having a plurality of apertures 19 horizontally disposed on an outwardly facing side thereof. The apertures 19 are dimensioned to receive a plurality of corresponding male butterfly type clips 21 of the type generally known in the prior art which are horizontally disposed along the bottom peripheral edge of the cover member rear panel 23. The butterfly style clips 21 comprise a substantially planar, oval tongue rotatably mounted to the rear panel proximal its peripheral edges and dimensioned to fit horizontally within said apertures 19. Accordingly, when the cover member is completely extended, the rear panel 23 may be tightly secured to the tailgate by rotating each male butterfly clip to a substantially horizontal position and inserting it into a corresponding aperture 19 until the tongue completely protrudes from an opposing side thereof and rotating the clip to an oblique or a vertical position as depicted in FIG. 5.

Horizontally disposed along the outwardly facing side of each channel 6 is a series of aligned apertures 20. The apertures 20 receive corresponding male snap style closures 39 horizontally disposed along the opposing peripheral edges of the cover member side walls. Similarly disposed on the inwardly facing sides of each channel are a plurality of apertures 22 to which bunge cords, cables or similar devices may be attached for securing cargo.

Figure 6:
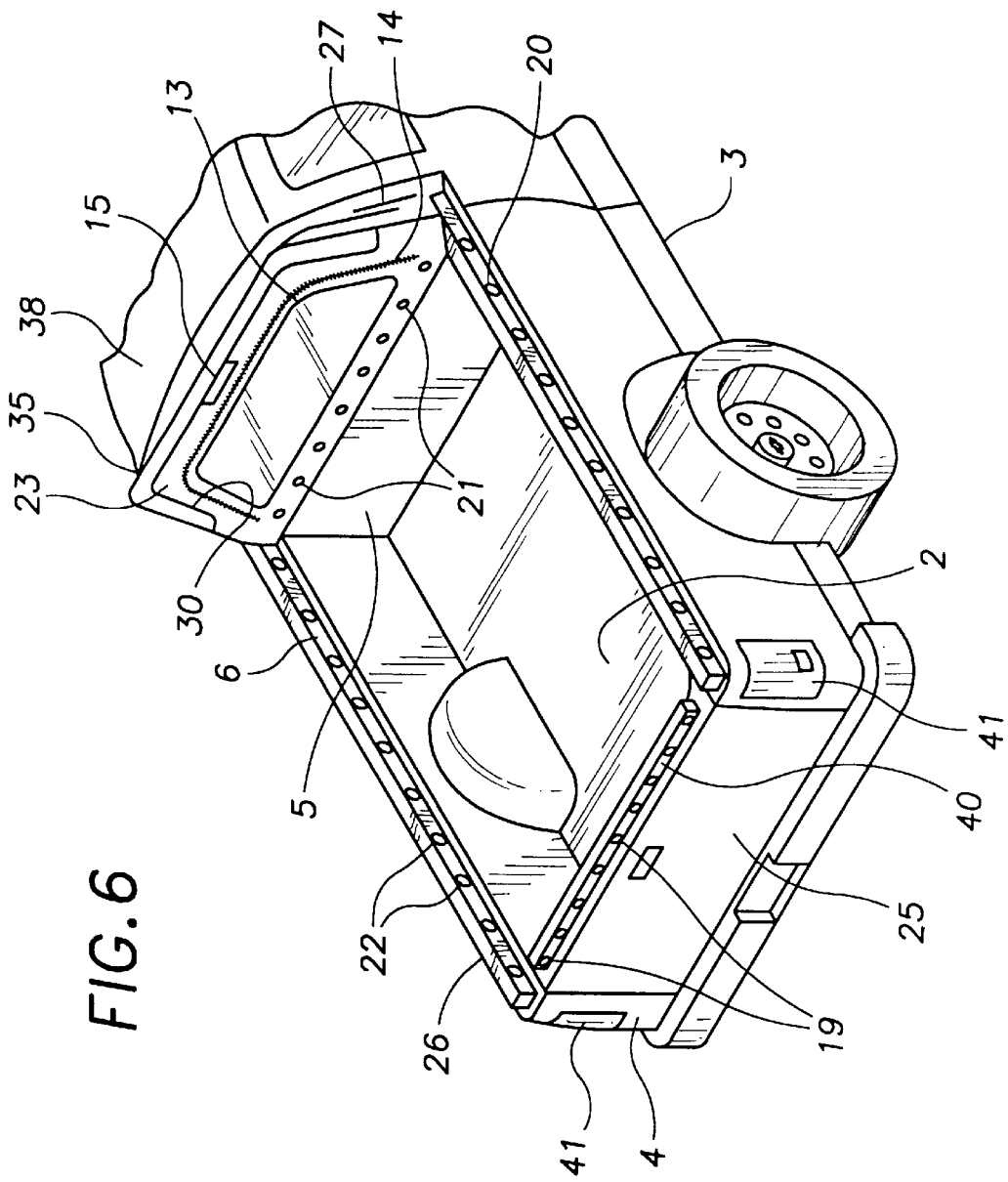
FIG. 6 is a perspective view of the cover in a collapsed position.
Figure 4:
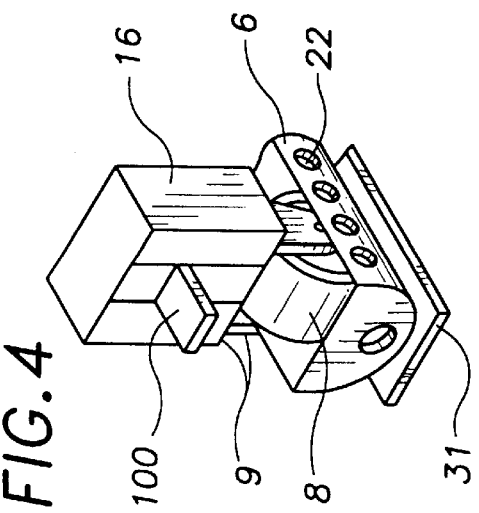
FIG. 4 is a detailed view of the roller and latch means in communication with the spring loaded lock mechanism.

Attached to the rear wall of the truck passenger cab 38, preferably surrounding its rear window and substantially aligned with its peripheral edges is a substantially inverted U-shaped sleeve 27. Attached to the peripheral edge of the sleeve is an inwardly facing arcuate planar flap 35 which is substantially parallel to the rear wall of the passenger cab for receiving the cover when in the collapsed position as depicted in FIG. 6. The sleeve 27 and flap 35 are easily attached to the passenger cab rear wall using any suitable attachment means such as screws, adhesives, bolts, etc. On a side of the flap 35, preferably the side facing the rear wall of the passenger cab 38 is a strip of Velcro® 30 substantially parallel to each of the flap's peripheral edges to form a substantially inverted U-shaped pattern. The Velcro® strip selectively engages a similarly disposed strip 36 of Velcro® on the rear panel of the cover member that is adjacent and parallel to three peripheral edges thereof.

The frame members 16 are preferably constructed with anodized aluminum or a similar lightweight rust, resistant material. As previously mentioned, the cover member 12 is constructed with canvas or a similar durable material. The rollers may be fabricated with plastic, rubber or a similar lightweight but rigid material. As will be readily apparent to those skilled in the art, various materials of construction may be used for the above described components. The dimensions of the device may also be varied to fit a particular truck model or vehicle size. Although there has been shown and described the preferred embodiment of the present invention, modifications may be made thereto which do not exceed the scope of the appended claims. Therefore, the scope of the invention is only to be limited by the following claims.

What is claimed is:

1. In combination with a pick up truck having an open bed with front and rear walls upwardly depending therefrom and first and second side walls upwardly depending from said open bed and perpendicularly disposed between said rear and front walls, each of said side walls having a top surface, said pickup truck further including a passenger cab having a rear wall which is immediately adjacent to said front wall, and a pair of opposed brake lights on the rear wall of said truck, a pickup truck bed cover comprising:

a plurality of substantially U-shaped frame members, each having first and second terminal ends;

first and second open elongated channels, the first channel attached to the top surface of the first side wall, the second channel attached to the top surface of the second side wall;

a roller attached to each terminal end of each U-shaped frame member, the rollers at the first terminal ends removably received within the first channel and the rollers at the second terminal ends remvoably received within the second channel so that said frame members may be selectively moved backwards and forwards along said truck bed side walls;

a cover member overlaying said frame members, said cover member having a pair of side walls and a rear panel; said rear panel and side walls terminating at a lower edge, said cover member having a plurality of sleeves extending from the lower edge of one of said cover member side walls to the lower edge of the other cover member side wall, each of said sleeves having a frame member received therein;

means for selectively anchoring each of said rollers at a desired location within said channel.

2. A pickup truck bed cover according to claim 1 further comprising:

an auxiliary brake light disposed on the rear panel of said cover member for supplementing the pair of opposed brake lights on said truck rear wall.

3. A pickup truck bed cover according to claim 2 further comprising:

a substantially U-shaped storage sleeve attached to the rear wall of the pickup truck passenger cab for receiving said cover and said frame members when in a collapsed position, said sleeve having a flap depending therefrom for retaining said cover and frame members within said storage sleeve.

4. A pickup truck bed cover according to claim 3 further comprising a window integral with said rear panel.

5. A pickup truck bed cover according to claim 4 further comprising a zippered access on said rear panel.

6. A pickup truck bed cover according to claim 5 further comprising means for attaching the lower edge of said rear panel to said rear wall of said pickup truck.

7. A pickup truck bed cover according to claim 6 wherein said means for attaching the lower edge of said rear panel to said rear wall of said pickup truck comprises:

a longitudinal track mounted to the top surface of said truck bed rear wall, said track having a plurality of aligned track apertures thereon;

a plurality of butterfly type clips horizontally disposed on said rear panel of said cover member adjacent the lower edge thereof for selectively engaging said track apertures.

8. A pickup truck bed cover according to claim 7 wherein said butterfly clips each comprise a substantially flat tongue rotatably mounted to said rear panel and dimensioned to protrude through said track apertures when said tongues are in a substantially horizontal position whereby said clips may be rotated to secure said rear panel to said track and to release said rear panel therefrom.

9. A pickup truck bed cover according to claim 8 further comprising means for attaching the lower edges of said cover member side walls to said side walls of said pickup truck bed.

10. A pickup truck bed cover according to claim 9 wherein said means for attaching the lower edges of said cover member side walls to said side walls of said pickup truck bed comprises:

a plurality of channel apertures horizontally disposed on an outwardly facing side of each channel;

a plurality of snap style protrusions horizontally disposed on each side wall of the cover member proximal the lower edges thereof for selectively engaging said channel apertures.

11. A device according to claim 10 wherein an inwardly facing side of each channel has a plurality of inner apertures disposed thereon to which a rope can be attached.

12. A device according to claim 11 further comprising an elongated strip of flexible material interposed between each of said channels and the top surface of said truck bed side walls for providing a moisture tight seal therebetween.

13. A device according to claim 12 wherein said flap on said storage sleeve has a strip of hook and loop fastener on a side thereof.

14. A device according to claim 13 wherein said rear panel of said cover member has a strip of hook and loop fasteners disposed thereon for selectively engaging said fastener on said flap.

* * * * *